United States Patent [19]

Norberg et al.

[11] Patent Number: 4,633,424

[45] Date of Patent: Dec. 30, 1986

[54] PROGRAMMABLE MULTI-CHANNEL TOOL MONITOR WITH MULTIPLE ALARM LIMITS AND SENSOR TARING

[75] Inventors: Rolf Norberg, Gavle, Sweden; Tomas Svensson, Laubershausen, Fed. Rep. of Germany

[73] Assignee: Santrade Ltd., Lucerne, Switzerland

[21] Appl. No.: 774,434

[22] Filed: Sep. 10, 1985

Related U.S. Application Data

[62] Division of Ser. No. 552,434, Nov. 16, 1983.

[51] Int. Cl.⁴ ............................................. G06F 15/20
[52] U.S. Cl. ............................... 364/571; 340/347 CC
[58] Field of Search .......................... 364/571, 176; 340/347 CC; 73/1 R, 1 B, 1 D, 1 E

[56] References Cited

U.S. PATENT DOCUMENTS

| | | | |
|---|---|---|---|
| 4,192,005 | 3/1980 | Kurtz | 364/571 |
| 4,193,039 | 3/1980 | Massa et al. | 364/571 |
| 4,198,677 | 4/1980 | Brunner et al. | 364/571 |
| 4,399,515 | 8/1983 | Gross | 364/571 |
| 4,446,715 | 5/1984 | Bailey | 364/571 |
| 4,479,190 | 10/1984 | Takai et al. | 364/571 |

*Primary Examiner*—Gary Chin
*Attorney, Agent, or Firm*—Burns, Doane, Swecker & Mathis

[57] ABSTRACT

A multiple condition sensing and multiple alarm generating monitor for an automated machine tool which is repetitively stepped through a predetermined sequence of operations comprises a sensor for sensing each of a plurality of tool operated conditions; a memory for storing, for each sensed condition and for each tool operation or predetermined block of tool operations, alarm limit data defining a set of first alarm limits; a memory addresser for sequentially accessing the memory in response to predetermined control signals used to control operation of the machine tool such that the alarm limit data accessed is changed in synchronization with operation of the machine tool; and a comparator for comparing the output of each sensor with the currently accessed corresponding alarm limit data. Further, the output of each sensor is tared by deriving, prior to taring, a reference tare value from the electrical output signal produced by the sensor; taring in an analog fashion the output signal using an analog biasing signal derived from a low resolution approximation of the reference tare value; sampling the tared signal; converting each sample to a high resolution equivalent digital signal; and subtracting from each equivalent digital signal a high resolution digital tare signal corresponding to the difference between the reference tare value and the low-resolution approximation thereof, thereby producing fully tared digital sensor output signals.

7 Claims, 3 Drawing Figures

PROGRAMMABLE MULTI-CHANNEL TOOL MONITOR WITH MULTIPLE ALARM LIMITS AND SENSOR TARING

This application is a division of application Ser. No. 552,434, filed 11/16/83.

FIELD OF THE INVENTION

The present invention relates generally to tool monitoring, and more specifically to sensor taring and multiple alarm implementation in a tool monitoring system.

BACKGROUND OF THE INVENTION

Increasingly more sophisticated automated manufacturing systems are being developed and adopted by industry. Greater attention is being paid to automatic inspection and tool compensation to improve the productivity of such systems. An important aspect of such inspection is in-process inspection to spot dynamic failures, such as breakage or tool wear. A variety of techniques for real-time tool and process monitoring that would allow detection and correction of such errors have been and are currently being developed. A variety of approaches, which rely on sensing different operating conditions, have been utilized. There is thus a need for a flexible monitoring system which is readily adapted to different manufacturing systems, different monitoring techniques and different sensors.

In addition, due to the increasing precision of automatic manufacturing systems, there is an increasing need for tool monitoring techniques which incorporate multiple condition sensing and differentiation of alarm limits depending upon the particular operation being performed by a machine tool.

A further need dictated by the increasing precision and complexity of automated manufacturing systems is economic high-resolution taring of the output signals from multiple sensors, to compensate for sensor drift and ignore the effects of friction forces that are generated under no-load conditions.

SUMMARY OF THE INVENTION

Accordingly, it is a principal object of the present invention to provide a programmable multi-channel tool monitor with multiple alarm limits and automatic selection of alarm limits in dependence on the tool operation being performed.

It is a further object of the present invention to provide an automated tool monitor with a simplified, low-cost taring system.

In accordance with one aspect of the present invention a multiple condition sensing and multiple alarm generating monitor for an automated machine tool which is repetitively stepped through a predetermined sequence of operations comprises a sensor for sensing each of a plurality of tool operating conditions; a memory for storing, for each sensed condition and for each tool operation or predetermined block of tool operations, alarm limit data defining a set of first alarm limits; a memory addresser for sequentially accessing the memory in response to predetermined control signals used to control operation of the machine tool such that the accessed alarm limit data is changed in synchronization with operation of the machine tool; and a comparator for comparing the output of each sensor with the currently accessed corresponding alarm limit data. At least one factor for defining a corresponding set of further alarm limits as a function of the set of first alarm limits advantageously is also stored, and the comparator compares the output of each sensor with the set of further alarm limits. The monitor advantageously further comprises circuitry for disabling generation of selected alarms during predetermined periods o tool operation. The alarm limit data advantageously is stored in the memory in a two-dimensional column-row matrix, with each column being dedicated to a corresponding sensor and each row being dedicated to a corresponding tool operation or block of operations.

In accordance with a further aspect of the present invention, the output of a sensor producing an electrical output signal is tared, to provide a reference zero level, by: deriving a reference tare value from the output signal prior to taring; taring in an analog fashion the output signal using an analog biasing signal derived from a low resolution approximation of the reference tared value; sampling the tared signal; converting each sample to a full resolution equivalent digital signal; and subtracting from each equivalent digital signal a full resolution digital tare signal corresponding to the difference between the reference tare value and the low-resolution approximation thereof, thereby producing fully tared digital sensor output signals. Advantageously the reference tare value corresponds to the magnitude at a predetermined time of the output signal after amplification by an amplifier, and the analog biasing signal advantageously controls the amplification of the amplifier.

These and other features and advantages of the present invention will be apparent from the following detailed description of preferred embodiments illustrated in the accompanying drawings.

DETAILED DESCRIPTION OF THE PREFERRED EMBODIMENTS

Figure 1:
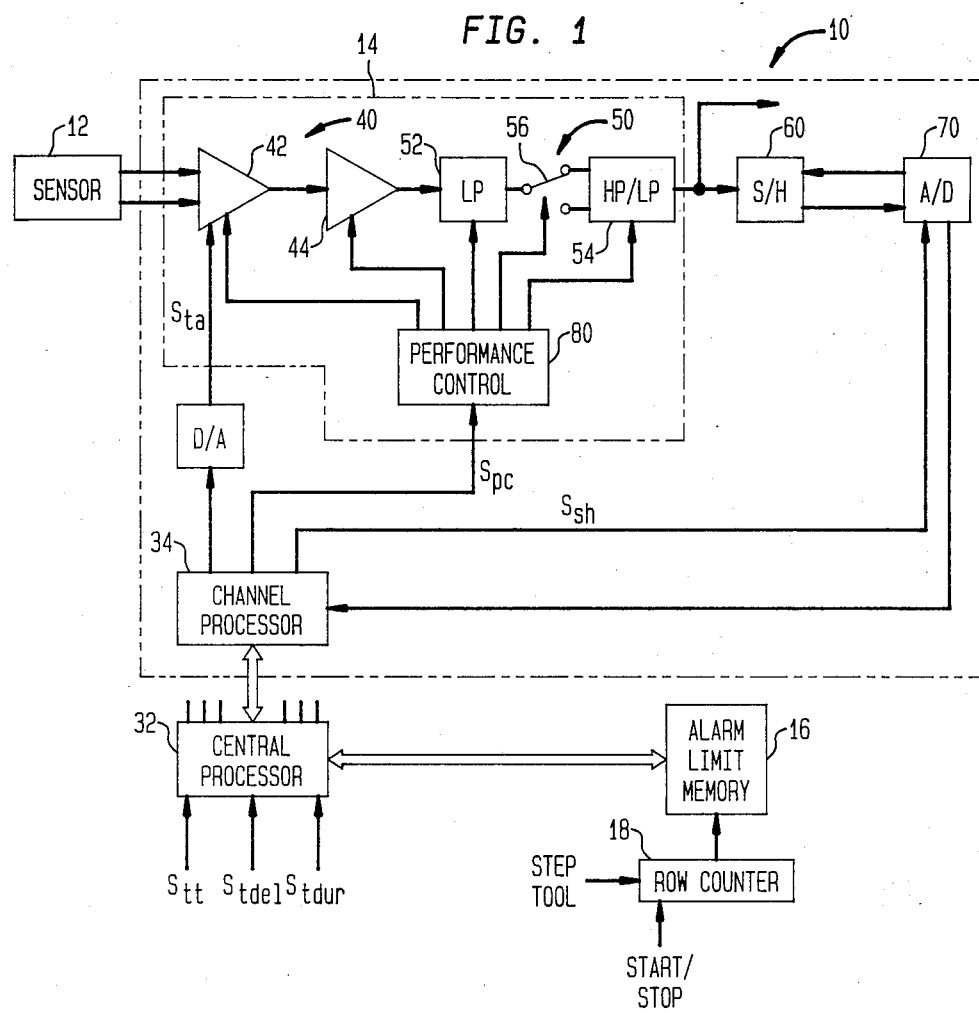
FIG. 1 is a diagrammatic circuit schematic of a tool monitor constructed in accordance with the present invention.

The illustrated preferred embodiment of a programmable, multichannel machine tool monitor constructed in accordance with the present inveniton is specifically adapted to monitor machine tools which are repetitively stepped through a predetermined sequence of operations, e.g., numerical control systems. The monitor generally comprises a separate signal processing circuit, generally denoted 10, for each sensor 12 that is used to monitor a particular operating condition, such as feed force, for example. Each signal processing circuit 10 is computer programmable to interface the monitor with a particular sensor selected by the operator and the particular machine being monitored. Each sensor 12 and associated signal processing circuit 10, hereinafter referred to collectively as a "channel" unit, monitors a selected machine operating parameter and compares the sensed operating condition with prestored, operator-programmable alarm limits to determine the existence of an alarm condition. When an alarm condition is determined to exist, a predetermined machine shutdown or other control signal (not shown) is generated and/or a predetermined alarm display (not shown) is activated.

An alarm limit memory 16 is organized to store separate alarm limit information, e.g., maximum permissible signal levels and maximum permissible durations of such signal levels, for each sensor 12 and for each operation or "block" of related operations. Advantageously, alarm limit data is stored in memory 16 in a two-dimensional matrixed format, wherein each column is dedicated to one channel unit and each row to a monitoring block or processing step.

The memory can be randomly-accessed in a conventional manner using individualized BCD address signals. However, the generation of such address signals might be difficult in a machine such as a numerical control machine. Therefore, in accordance with the invention, the basic access, or address, method is to sequentially address each row in the memory in response to signals which are inherently generated by the machine for control purposes. This addressing of the memory can be carried out with a memory pointer comprising a row counter 18 which is incremented in response to machine control or timing signals that signify the start and/or finish of each operation/block. The counter 18 is reset in response to machine signals signifying the start or finish of a machine cycle.

Additional alarm limits related to the store limits can also be calculated using operator selectable transformation functions, e.g., multiplication factors. Advantageously, the sensor peak signal data is stored separately in the alarm limit memory and different alarm levels are calculated from the peak values by multiplying them by separately stored alarm factors for each channel. Further, selective enabling of the alarm function advantageously is provided such that only predetermined maximum range alarms are enabled during selected machine operating periods, e.g., during tool and workpiece repositioning between tool work operations, when acceptable peak sensor signals typically occur which exceed the peak signals permitted when the workpiece is actually being worked.

Figure 2:
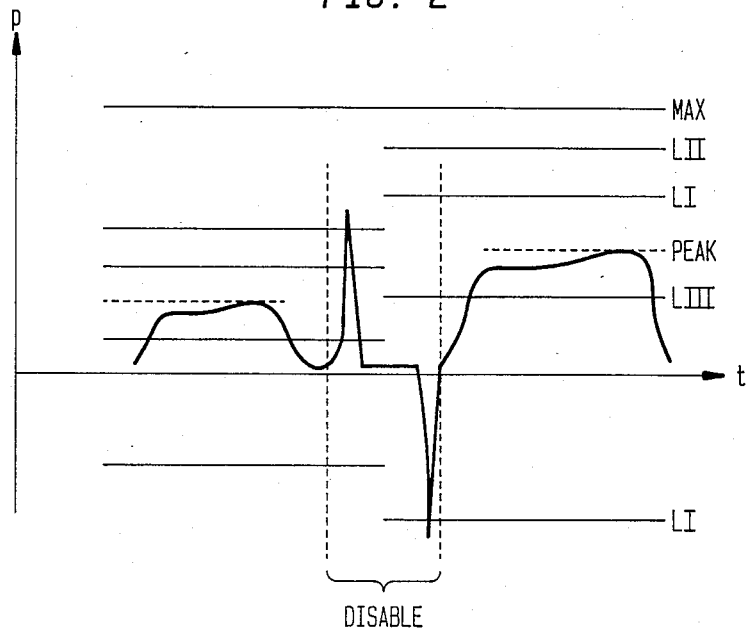
FIG. 2 is a graph illustrating the relationship of the alarm limit values to the sensor signal in a normal operating mode.

More particularly, and with reference to FIG. 2, when a new operating condition is first initiated, for example when a fresh tool has been installed on the machine or a new batch of workpieces are to be worked, the machine is first stepped through its sequence of operations in a learning mode, and the sensed force p is measured. In the learning mode, the peak sensor value for each operation is detected and stored in the memory 16. Also stored in the memory are user selected alarm limit factors which, when multiplied by the peak value for an operation, determine the acceptable alarm levels for that operation. As shown in FIG. 2, three alarm levels are established for each operation. The first level (LI) can relate to tool wear and be equal to 1.2 times the peak value, for example. The second level (LII) can relate to tool breakage and be 1.5 times the peak value, for example. A third level (LIII) might function as a lost tool detector and be equal to 0.5 times the stored peak value, for example.

Each alarm limit factor also has an associated, user-selected, response time that is likewise stored in the memory. For example, the response time for LI might be 700 ms so that if the sensor signal exceeds 1.2 times the stored peak value for this duration of time, an alarm signal is provided to indicate excessive tool wear. Similarly, if the sensor signal exceeds 1.5 times the peak value for 10 ms, for example, a signal can be provided to prevent breaking of the tool, or if the signal does not remain above the LIII level for at least 50 ms after it first reaches this level, a signal can be provided to indicate that the machining operation has been prematurely interrupted.

Between each individual operation the sensor signal might normally exceed the acceptable alarm limits for an operation, for example due to acceleration of the tool for repositioning. In such a case, the comparison of the sensor signal to the LI-LIII alarm levels can be disabled for a predetermined time after each step tool signal, to avoid unnecessary generation of alarm signals. However, it may be advantageous to have a fourth, maximum alarm level that is not disabled, to detect improper conditions during repositioning.

System operation, including communication with the operator, configuration of the monitor to establish an interface with the machine to be monitored and with the monitoring sensors, control of monitor operation to define selected operating modes, generation and storage of alarm limit data, supervision of channel operation, and the processing of the sensor data are handled by a distributed logic microprocessor network, comprising a central processor 32 and a separate local processor 34 for each channel unit. The central processor 32 handles operator communication, generation of general system control signals, and the generation and storage of alarm limit data, e.g. multiplication of the stored peak value by the alarm limit factors to generate the alarm levels. Processing of the sensor data is handled principally by the local channel processor 34.

Once the monitor has been installed and the interfacing and alarm limit parameters defined, at start-up the central processor 32 performs a check-up of system functions, and downloads channel-specific interfacing and initial alarm limit parameters to the local processor 34 for each active channel unit. During monitoring, the central processor 32 updates each channel unit with new alarm limit data for each block in response to the machine control signals used as reference signals. The central processor 32 also performs a continuous self-test verification procedure to confirm proper operation of the channel unit, and continuously updates various indicating displays (not shown) based on data received from the channel units.

For each machine operation or operation block for which taring is to be provided, the conditioned, but untared, output of each sensor 12 which is to be tared is monitored for a predetermined period commencing at a predetermined time following a reference trigger signal to define the offsetting or compensating reference value necessary to tare the output of sensor 12. It will be appreciated that the monitor is advantageously programmable to allow taring with respect to either individual channels or all channels simultaneously. Further, the frequency with which the tare reference value is recalculated, e.g., each time an operation or block of operations is performed or once a day, is also advantageously programmable. Similarly, the monitor is advantageously programmable to allow the creation of tare values which are applicable to more than one operation or block of operations for a given channel.

The reference trigger signal advantageously is a selected machine or monitor generated control signal which is associated with start-up of the machine operation being sensed, and the time delay before sensor monitoring commences is selected to coincide with stabilization of the operating condition being sensed following start-up. For example, it may be desirable to institute a taring operation when a motor is running at a nominal speed. However, the tool controller only generates a control signal to first actuate the motor, but not when it reaches its nominal speed. The time delay provides a suitable interlude between generation of the control signal and the institution of taring that is sufficient to enable the motor to reach its nominal speed.

The monitoring period is selected to provide either an effectively "instantaneous" sample of the sensor output or a relatively prolonged sample from which an average sensor output can be derived. It will be appreciated that different control signals can be used as the reference signals for each sensor and each operation or block. Similarly, different time delays and monitoring periods can be used for different sensors and operations or blocks. Advantageously, to simplify installation, different time periods can be selected for different sensors but not for different operations or blocks.

Figure 3:
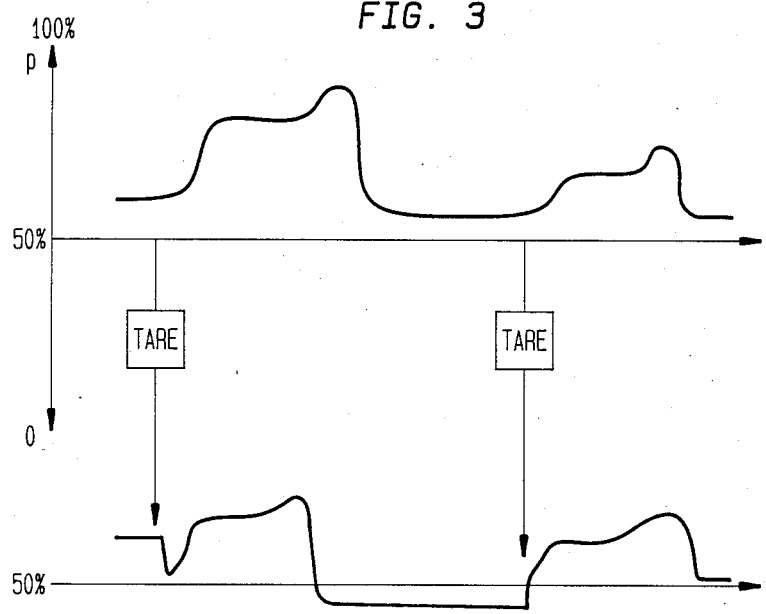
FIG. 3 is a graph illustrating the tared and untared sensor signals.

Either the instantaneous value or the averaged value of the untared sensor output occurring at the selected tare time defines the offsetting or compensating reference value necessary to fully tare the output of a sensor 12. A low resolution approximation of the reference value is used to generate an analog biasing signal which causes the conditioned sensor output to be tared, i.e., reduced in magnitude, by a first taring factor, for example to center the conditioned sensor output at 50% of the total response range of the monitor, as shown in FIG. 3. A further, high resolution digital biasing signal, corresponding to the difference between the reference tare value and the low resolution approximation thereof used to generate the analog biasing signal, is also calculated. The low resolution, analog tared sensor output is sampled, each sample is converted to a high resolution digital signal, and a digital biasing signal is subtracted therefrom to obtain fully tared digital signals which are compared with digital signals corresponding to alarm limit levels to determine the existence of an alarm condition. In addition, the digital biasing signal can be used to change the zero reference point from the center of the sensor response range to one end thereof, to measure the signal against the other end of the range.

Once the analog biasing signal has been obtained for a given sensor, machine and operation or block, it is not necessary to repeat the process of generating the signal each time the operation block is subsequently performed. The digital equivalent of the biasing signal advantageously is stored and simply addressed prior to initiation of each block. Alternatively, a single analog taring signal which is not changed during the monitoring process is derived for each channel and is applied at power up to automatically compensate the unloaded sensor. However, the digital biasing signal for each block advantageously accounts for sporadic, short-term variations in the sensor output.

Preferred apparatus for implementation of the taring method of the present invention will now be described. As shown, each monitor channel comprises a sensor 12 and signal conditioning circuitry, generally denoted 14, for conditioning the sensor output to interface sensor 12 with other monitoring components (not shown). As shown in the Figure, signal conditioning circuitry 14 advantageously comprises an amplifier stage, generally denoted 40, and a filter stage, generally denoted 50. Amplifier 40 advantageously comprises an input amplifier 42 and a buffer amplifier 44. The amplification of each amplifier 42, 44 is determined by the sensitivity of sensor 12 and the scaling thus required to obtain full range readings on the monitor display units (not shown). As will be discussed in more detail hereinbelow, amplifier 42 is further provided with a biasing input which reduces the magnitude of the amplifier output in relation to the biasing signal.

As shown, filter 50 advantageously comprises a low-pass filter 52 and a high-pass/digital low-pass filter 54. Low-pass filter 52 removes high-frequency noise from the sensor output signal. A switch 56 selectively connects the output signal from the filter 52 to either the high-pass or the low-pass portion of the filter 54. The high-pass portion of filter 54 can be used to remove the d.c. component of the output signal for RMS measurements. The digital low-pass portion of filter 54 can be used to provide further signal smoothing to reduce the influence of each sample, particularly in the case of sensor signals obtained in noisy environments.

As shown, the amplification factors of amplifier 40, and the cut-off frequencies of filter 50 and actuation of the switch 56 are controlled by a performance control circuit 80 which is responsive to control signals $S_{pc}$ generated by the associated channel processor 34 in dependence on operator-entered values received by central processor 32.

The output of filter 50 is fed to a sample-and-hold (S/H) circuit 60 which is connected to a full resolution (e.g., 12 bit) analog-to-digital (A/D) converter 70. S/H circuit 60 is triggered by a trigger signal generated by A/D converter 70 in response to a control signal $S_{sh}$ generated by the local channel processor 34. The timing of signal $S_{sh}$ is determined in dependence on an operator-selectable signal $S_{tdel}$. A tare delay instruction corresponding to signal $S_{tdel}$ is transmitted from central processor 32 to local channel processor 34, which determines the time at which signal $S_{sh}$ is generated by processor 34 following receipt of a timing signal from processor 32 which is generated in response to a predetermined machine-generated signal $S_{tt}$. Signal $S_{sh}$ activates A/D converter 70 until a reset signal (not shown) is generated by processor 34 at the end of a block cycle. Once signal $S_{sh}$ has been generated, S/H circuit 60 is triggered by A/D converter 70 to sample the output of filter 50. The output of A/D converter 70 is fed to processor 34 for processing.

If the value of an operator-selectable signal $S_{tdur}$ corresponds to an "instantaneous" monitoring period, then channel processor 34 is instructed by central processor 32 to use the output of A/D converter 70 corresponding to the initial S/H circuit sample as the reference tare value. If the value of signal $S_{tdur}$ corresponds to a prolonged monitoring period, then channel processor 34 is instructed by central processor 32 to calculate the mean value of the A/D converter outputs corresponding to the S/H circuit samples obtained during the time period defined by signal $S_{tdur}$, and use the calculated mean value as the reference tare value.

The closest low resolution (e.g., 8-bit) approximation of the reference tare value is then generated by processor 34 and converted to an analog taring signal $S_{ta}$ by a digital-to-analog (D/A) converter 20. Signal $S_{ta}$ is fed to amplifier 42 as a bias signal which reduces the amplified sensor signal by the appropriate tare value, as illustrated in FIG. 3. Processor 34 also calculates a full resolution (e.g., 12-bit) digital taring signal $S_{td}$ which corresponds to the difference between the low resolution approximation used to generate signal $S_{ta}$ and the reference tare value.

Once signal $S_{ta}$ has been generated, signal $S_{td}$ is subtracted from each output of A/D converter 70 to obtain sensor output samples which have been accurately tared with full resolution. The fully tared samples are compared with the alarm limit data transmitted to the corresponding local processor 34 for the machine operation or block being monitored to determine the existence of an alarm state.

The use of two different resolutions for the analog and digital tare values results in a cost savings while at the same time assuring high accuracy. More particularly, the hardware implementation of the taring function, through the D/A converter 20, utilizes a lower resolution convertor and is therefore less expensive. At the same time, the higher resolution taring is performed by the software, and is therefore not costly to implement, and enables a highly accurate data signal to be obtained for comparison with the alarm limits.

Advantageously, the analog tared sensor output level, without digital taring, is also compared with an alarm level corresponding to the maximum full-scale input for the channel to determine the existence of a "crash" alarm state which activates all alarm outputs.

It will be appreciated that the preferred embodiments described hereinabove are illustrative and that changes and modifications can be made within the scope of the present invention.

We claim:

1. Apparatus for taring the output of a transducer which produces an electrical output signal, comprising:
   signal conditioning means which receives said electrical output signal and produces an analog output signal;
   means for deriving a reference tare value from said output signal of said conditioning means;
   means for determining a low resolution approximation of said reference tare value and for producing a biasing signal that is applied to said conditioning means to cause said analog output signal to be tared by a factor corresponding to the magnitude of said biasing signal;
   means for producing a high resolution digital output signal corresponding to the analog output signal of said conditioning means;
   means for generating a high resolution digital tare signal correspoinding to the difference between said reference tare value and said approximation thereof; and
   means for subtracting said digital tare signal from said digital output signal to obtain a fully tared transducer signal.

2. The apparatus of claim 1 wherein said deriving means comprises means for sampling the magnitude of the untared output of said conditioning means at a predetermined time to obtain a sample, the value of which constitutes said reference tare value.

3. The apparatus of claim 1 wherein said deriving means comprising means for sampling the magnitude of the untared output of said conditioning means for a predetermined duration commencing at a predetermined time to obtain a plurality of samples, and means for averaging the plurality of samples to obtain said reference tare value.

4. The apparatus of claim 3, wherein said deriving means includes said means for generating said high resolution digital output signal, and said means for producing said biasing signal comprises means for producing a low resolution digital signal from a high resolution digital output signal corresponding to said reference tare value, and digital-to-analog converter means for converting said low resolution digital signal to an analog signal constituting said biasing signal.

5. The apparatus of claim 3 further including means for controlling said sampling means to vary said predetermined time and said predetermined duration.

6. A method for taring the output of a transducer producing an electrical output signal comprising the steps of:
   deriving a reference tare value from said output signal prior to taring;
   taring in an analog fashion said output signal using an analog biasing signal derived from a low resolution approximation of said reference tare value to produce a coarsely tared signal;
   sampling said coarsely tared signal, converting each sample to a high resolution equivalent digital signal, and subtracting from each equivalent digital signal a high resolution digital tare signal corresponding to the difference between said reference tare value and said low-resolution approximation thereof, thereby producing fully tared digital transducer output signals.

7. The method of claim 6 wherein said reference tare value corresponds to the magnitude at a predetermined time of said output signal after amplification by amplifier means, and said analog biasing signal controls the amplification of said amplifier means.

* * * * *